United States Patent
Okuyama

(10) Patent No.: US 11,333,917 B2
(45) Date of Patent: *May 17, 2022

(54) DISPLAY DEVICE HAVING A LIQUID CRYSTAL LAYER INCLUDING STREAK-LIKE POLYMERS WITH LIQUID CRYSTAL MOLECULES

(71) Applicant: Japan Display Inc., Minato-ku (JP)

(72) Inventor: Kentaro Okuyama, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/120,478

(22) Filed: Dec. 14, 2020

(65) Prior Publication Data

US 2021/0096405 A1    Apr. 1, 2021

Related U.S. Application Data

(63) Continuation of application No. 16/360,651, filed on Mar. 21, 2019, now Pat. No. 10,908,446.

(30) Foreign Application Priority Data

Mar. 27, 2018  (JP) .............................. JP2018-059855

(51) Int. Cl.
    *G02F 1/1334*    (2006.01)
    *G02F 1/13357*    (2006.01)
    *G09G 3/34*    (2006.01)
    *G09G 3/36*    (2006.01)
    *G06F 3/14*    (2006.01)

(52) U.S. Cl.
    CPC ...... *G02F 1/1334* (2013.01); *G02F 1/133615* (2013.01); *G06F 3/1423* (2013.01); *G09G 3/3406* (2013.01); *G09G 3/3611* (2013.01); *G02F 2201/16* (2013.01); *G09G 2300/023* (2013.01)

(58) Field of Classification Search
    CPC .................................................... G02F 1/1334
    USPC ....................................................... 345/694
    See application file for complete search history.

(56) References Cited

U.S. PATENT DOCUMENTS

| | | | |
|---|---|---|---|
| 9,983,437 B2 | 5/2018 | Okuyama | |
| 10,908,446 B2 * | 2/2021 | Okuyama | G09G 3/3406 |
| 2004/0100598 A1 | 5/2004 | Adachi | |
| 2010/0085510 A1 | 4/2010 | Okuyama et al. | |
| 2011/0109663 A1 | 5/2011 | Uchida et al. | |

(Continued)

FOREIGN PATENT DOCUMENTS

| | | |
|---|---|---|
| JP | 2010-092682 | 4/2010 |
| JP | 5467389 | 4/2014 |

(Continued)

*Primary Examiner* — Long D Pham
(74) *Attorney, Agent, or Firm* — Oblon, McClelland, Maier & Neustadt, L.L.P.

(57) ABSTRACT

According to one embodiment, a display device includes a first display panel, and a polarizer opposed to the first display panel and having a transmission axis for transmitting linearly polarized light. The first display panel includes a first substrate, a second substrate opposed to the first substrate, and a first liquid crystal layer held between the first substrate and the second substrate and including streak-like polymers and liquid crystal molecules. An extension direction of the polymers is substantially orthogonal to the transmission axis.

14 Claims, 11 Drawing Sheets

(56) References Cited

U.S. PATENT DOCUMENTS

| | | | |
|---|---|---|---|
| 2013/0088529 A1* | 4/2013 | Takahashi | H04N 13/317 |
| | | | 345/690 |
| 2014/0036176 A1* | 2/2014 | Shinkai | G02B 6/0043 |
| | | | 349/15 |
| 2014/0300528 A1* | 10/2014 | Ebisui | G02F 1/133615 |
| | | | 345/32 |
| 2015/0185518 A1 | 7/2015 | Igarashi | |
| 2016/0070047 A1 | 3/2016 | Okuyama et al. | |
| 2016/0116768 A1 | 4/2016 | Okuyama et al. | |
| 2017/0160592 A1 | 6/2017 | Okuyama | |
| 2017/0219840 A1 | 8/2017 | Okuyama | |
| 2017/0285420 A1 | 10/2017 | Okuyama et al. | |
| 2018/0074356 A1 | 3/2018 | Okuyama | |

FOREIGN PATENT DOCUMENTS

| | | |
|---|---|---|
| JP | 2016-057338 | 4/2016 |
| JP | 2016-085452 | 5/2016 |

* cited by examiner

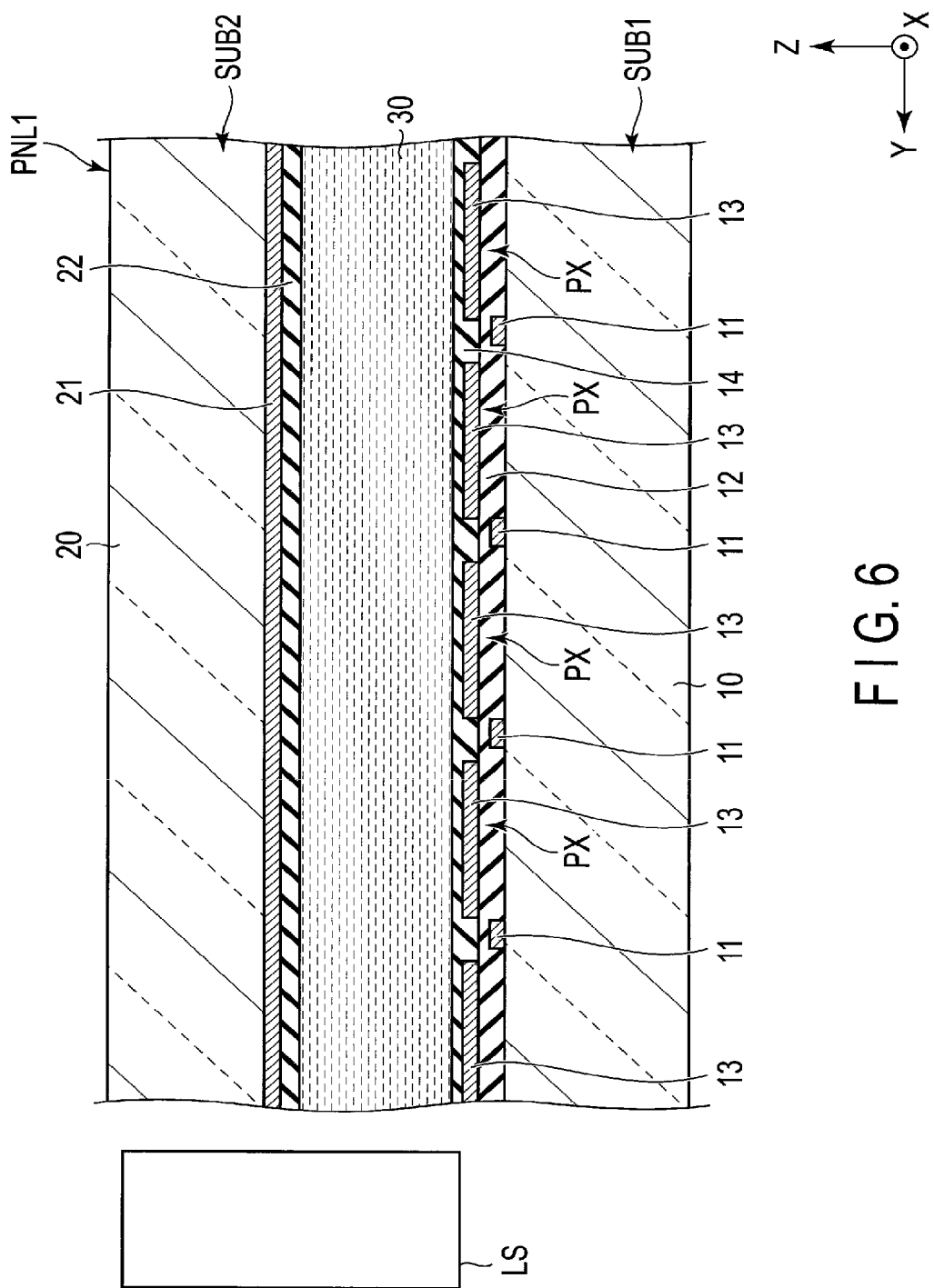
F I G. 6

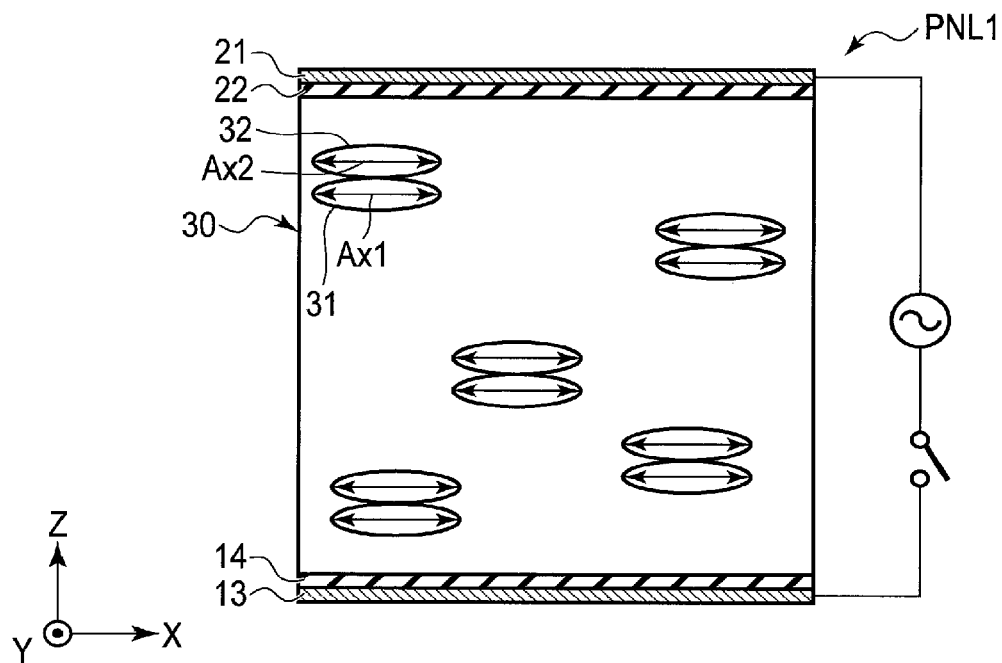
F I G. 7
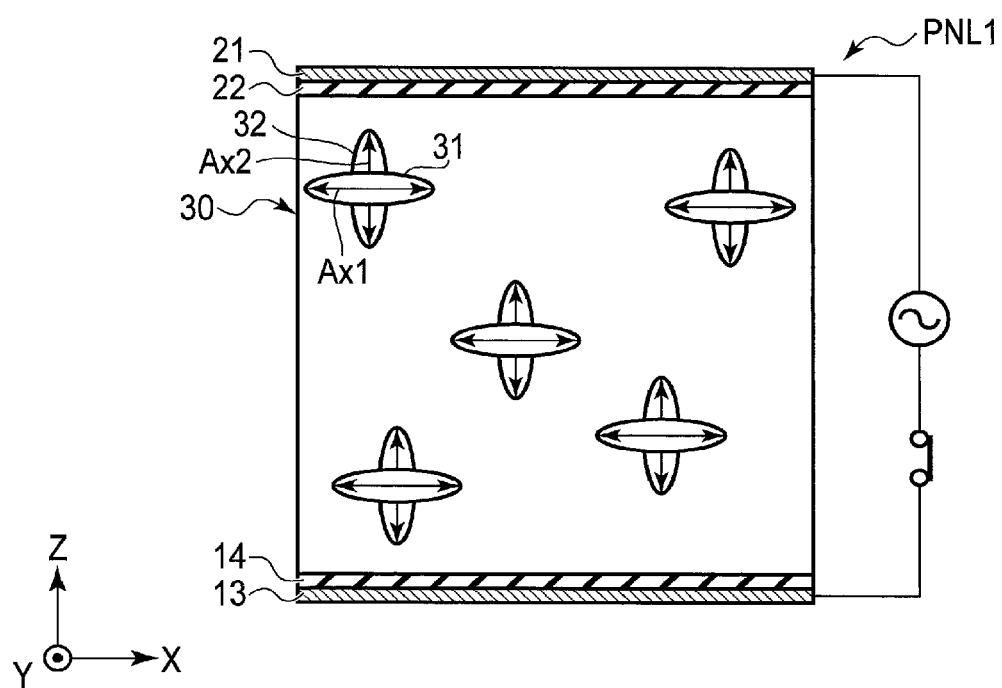
F I G. 8

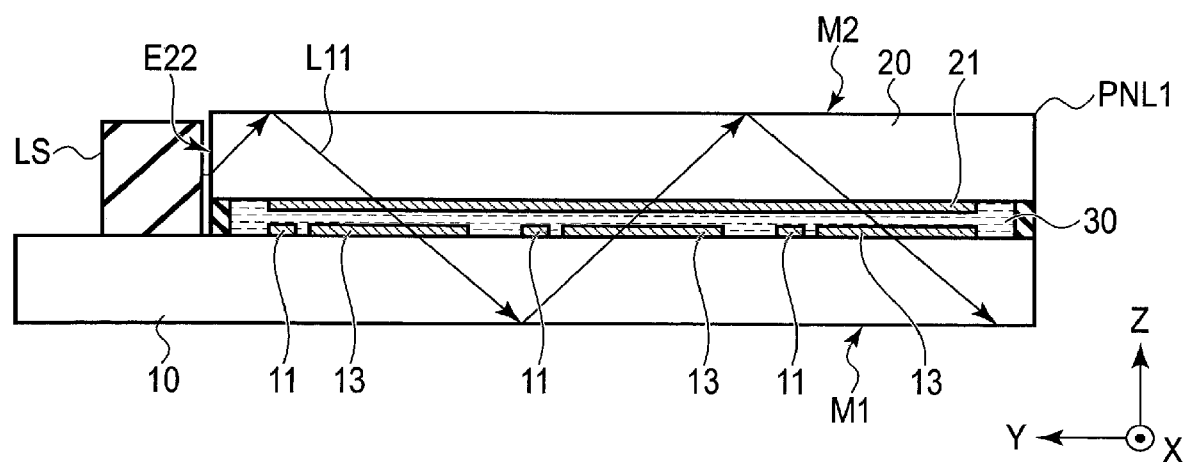
F I G. 9
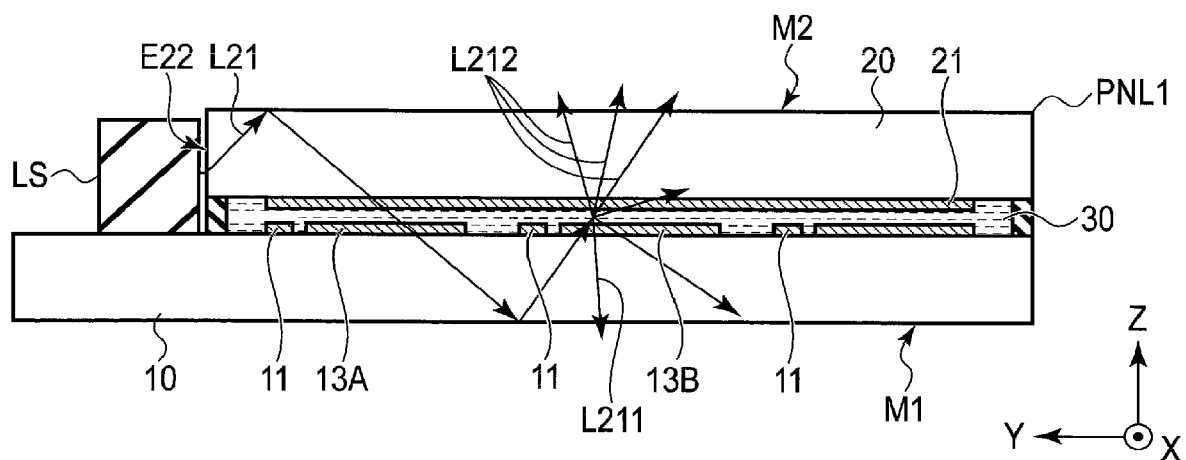
F I G. 10

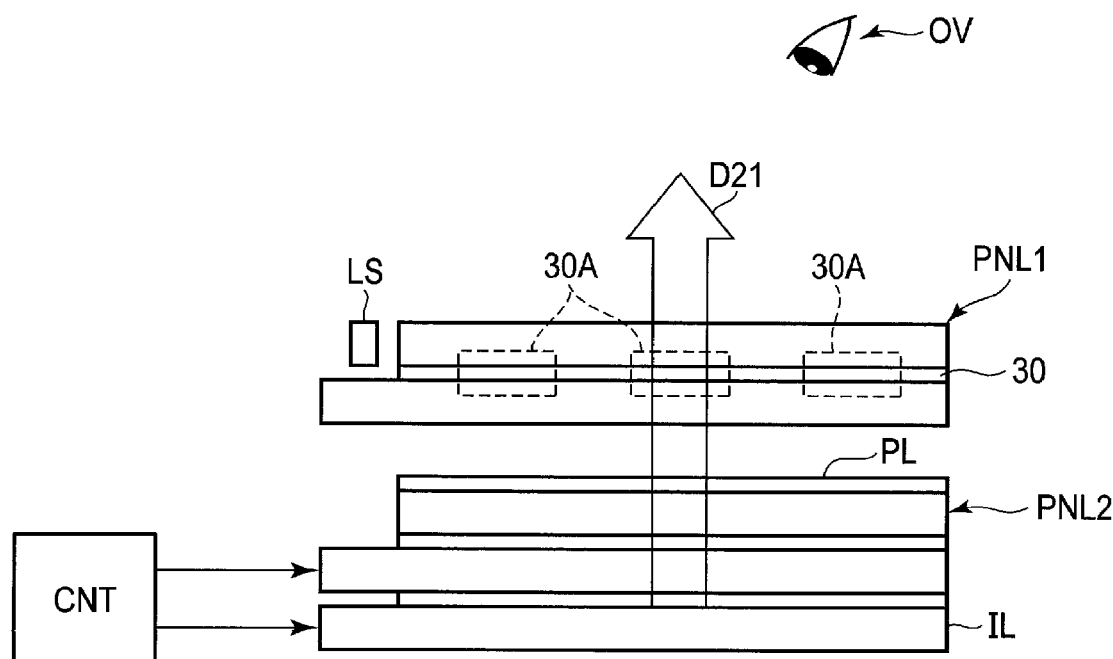
F I G. 13A
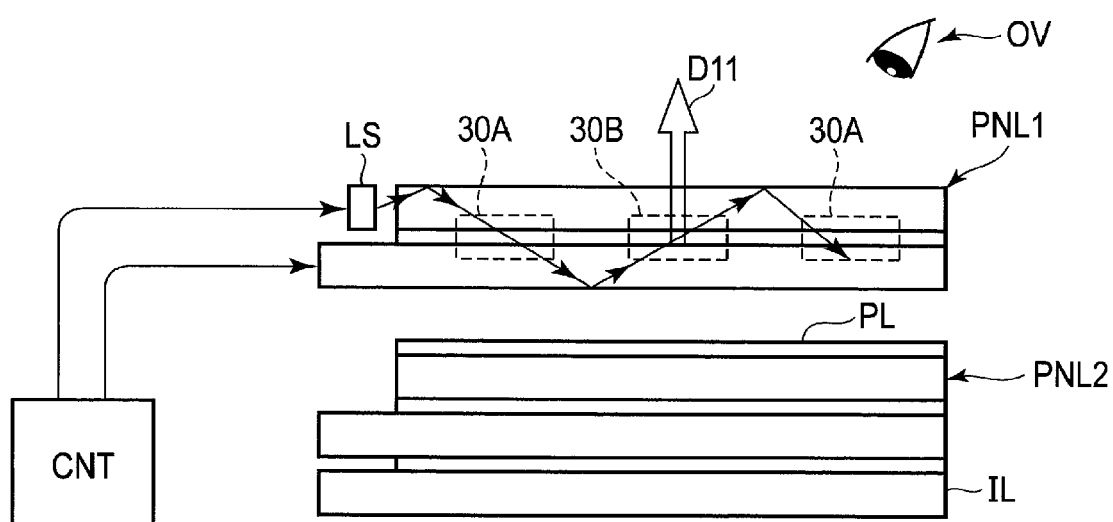
F I G. 13B

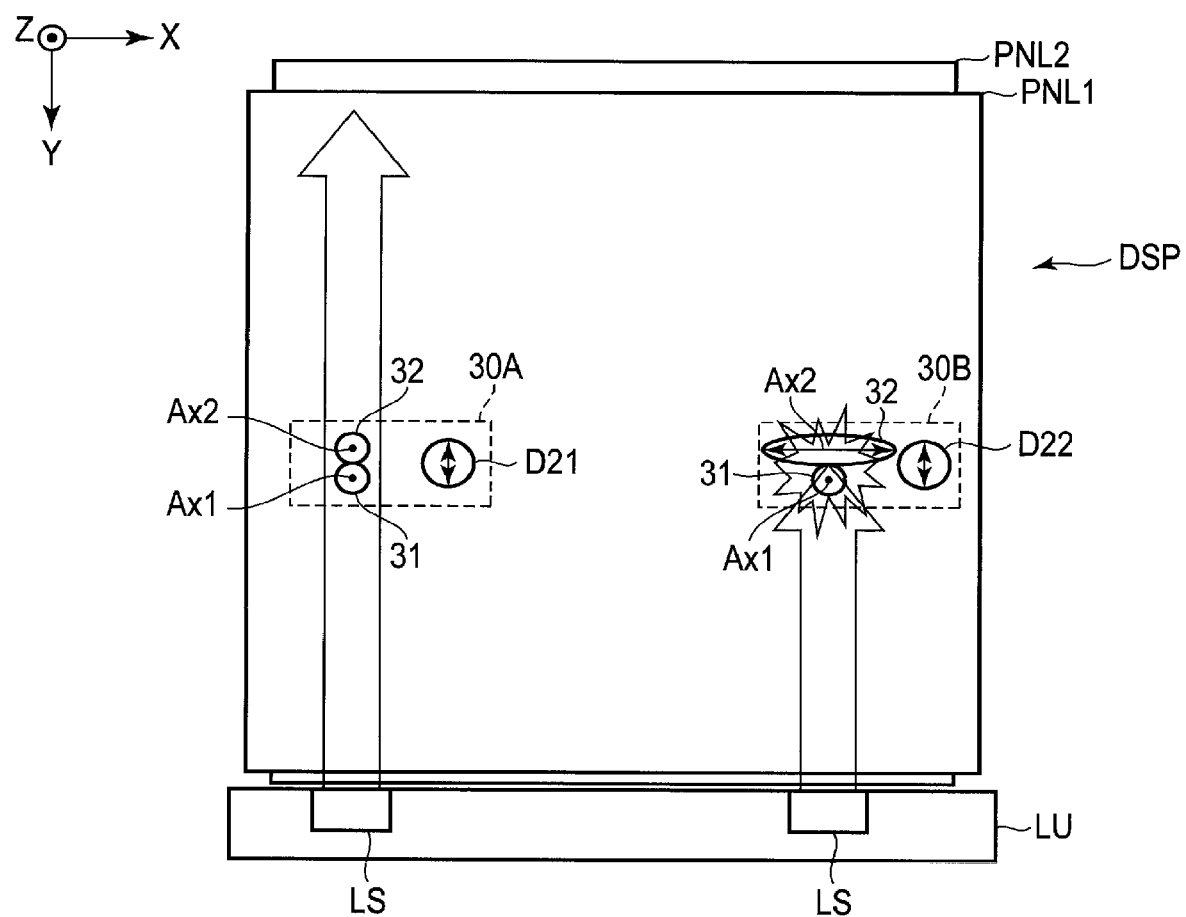
F I G. 15

DISPLAY DEVICE HAVING A LIQUID CRYSTAL LAYER INCLUDING STREAK-LIKE POLYMERS WITH LIQUID CRYSTAL MOLECULES

CROSS-REFERENCE TO RELATED APPLICATIONS

This application is a continuation of and claims the benefit of priority under 35 U.S.C. § 120 from U.S. application Ser. No. 16/360,651 filed Mar. 21, 2019, and claims the benefit of priority under 35 U.S.C. § 119 from Japanese Patent Application No. 2018-059855 filed Mar. 27, 2018, the entire contents of each of which are incorporated herein by reference.

FIELD

Embodiments described herein relate generally to a display device.

BACKGROUND

Recently, various types of illumination devices using polymer dispersed liquid crystal (hereinafter referred to also as "PDLC") capable of switching between a scattering state of scattering incident light and a transmitting state of transmitting incident light have been proposed.

Meanwhile, display devices using PDLC have been required to suppress degradation of display quality.

BRIEF DESCRIPTION OF THE DRAWINGS

FIG. 6 is an enlarged cross-sectional view of the first display panel PNL1 shown in FIG. 4.

FIG. 7 is a diagram schematically showing a first liquid crystal layer 30 in an off state.

FIG. 8 is a diagram schematically showing the first liquid crystal layer 30 in an on state.

FIG. 9 is a cross-sectional view showing the first display panel PNL1 in a case where the first liquid crystal layer 30 is in the off state.

FIG. 10 is a cross-sectional view showing the first display panel PNL1 in a case where the first display panel PNL1 includes an area in which the first liquid crystal layer 30 is in the on state.

FIG. 13A is an explanatory diagram showing a display mode of the display device DSP shown in FIG. 12.

FIG. 13B is an explanatory diagram showing a display mode of the display device DSP shown in FIG. 12.

FIG. 15 is a perspective view showing another configuration example of the display device DSP of the present embodiment.

DETAILED DESCRIPTION

Figure 1:
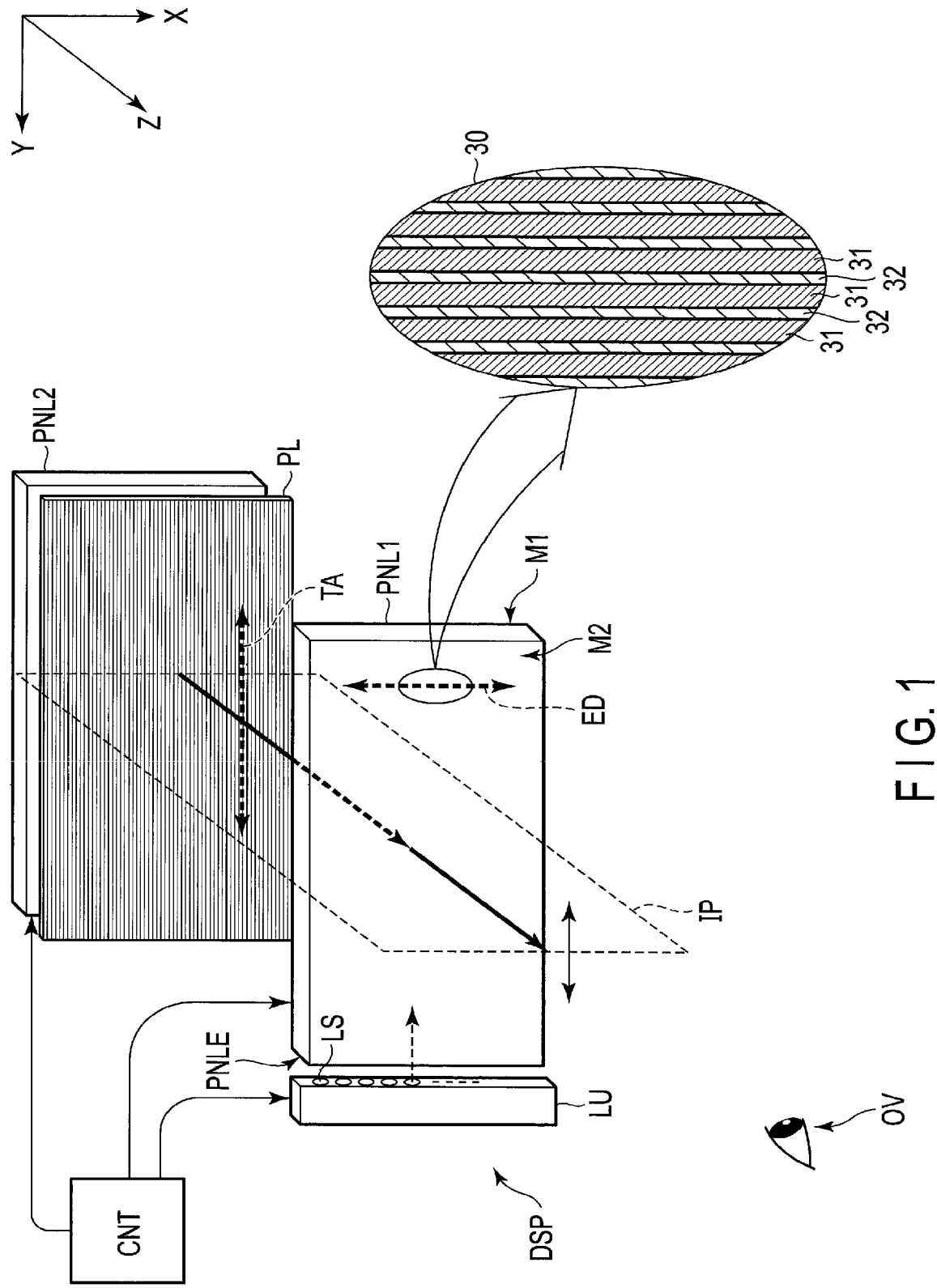
FIG. 1 is a perspective view showing a configuration example of a display device DSP according to the present embodiment.

In general, according to one embodiment, a display device comprising a first display panel and a polarizer opposed to the first display panel and having a transmission axis for transmitting linearly polarized light is provided. The first display panel comprises a first substrate, a second substrate opposed to the first substrate, and a first liquid crystal layer held between the first substrate and the second substrate and including streak-like polymers and liquid crystal molecules. An extension direction of the polymers is substantially orthogonal to the transmission axis.

According to another embodiment, a display device comprising a first display panel and a polarizer opposed to the first display panel is provided. The first display panel comprises a first substrate, a second substrate opposed to the first substrate, and a first liquid crystal layer held between the first substrate and the second substrate and including streak-like polymers and liquid crystal molecules. Linearly polarized light transmitted through the polarizer is transmitted through the first display panel and a polarization state thereof is maintained.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a perspective view showing a configuration example of a display device DSP according to the present embodiment. A first direction X, a second direction Y and a third direction Z are orthogonal to each other in the drawing but may intersect at an angle other than 90°. In some cases, a position on the leading end side of an arrow indicating the third direction Z may be referred to as "above" and a position on the side opposite to the leading end of the arrow may be referred to as "below" in the present specification. In the case of "a second member above a first member" and the case of "a second member below a first member", the second member may be in contact with the first member or may be away from the first member. In addition, an observation position OV at which the display device DSP is observed is assumed to be located on the leading end side of the arrow indicating the third direction Z, and a view from the observation position OV toward an X-Y plane defined by the first direction X and the second direction Y is referred to as planar view.

The display device DSP comprises a first display panel PNL1, a second display panel PNL2, a polarizer PL, a light source unit LU and a controller CNT.

The first display panel PNL1, the second display panel PNL2 and the polarizer PL are in the form of flat plates parallel to the X-Y plane. The display panel PNL2 is opposed to the first display panel PNL1. The polarizer PL is located between the first display panel PNL1 and the second display panel PNL2. The second display panel PNL2, the polarizer PL and the first display panel PNL1 are arranged in this order in the third direction Z. The light source unit LU is opposed to an end portion PNLE of the first display panel PNL1. The end portion PNLE extends in the first direction X. The first display panel PNL1 and the light source unit LU are arranged in this order in the second direction Y.

The light source unit LU comprises, for example, light-emitting elements LS as light sources. The light-emitting elements LS are, for example, light-emitting diodes. The light-emitting elements LS are arranged in the first direction X. The light emitted from each of the light-emitting elements LS travels in a direction substantially opposite to an arrow indicating the second direction Y and enters the first display panel PNL1 from the end portion PNLE.

The first display panel PNL1 is a liquid crystal display panel using PDLC and comprises a first main surface M1, a second main surface M2 and a first liquid crystal layer 30. The first main surface M1 and the second main surface M2 are surfaces parallel to the X-Y plane, for example. The first main surface M1 is opposed to the polarizer PL, and the second main surface M2 is located on the observation position OV side. The first liquid crystal layer 30 is located between the first main surface M1 and the second main surface M2.

The first liquid crystal layer 30 comprises polymer dispersed liquid crystal which contains polymers 31 and liquid crystal molecules 32 as shown in an enlarged view in FIG. 1. In one example, the polymers 31 are liquid crystalline polymers. The polymers 31 are in the form of streaks extending in the first direction X. An extension direction ED of the polymers 31 is parallel to the first direction X as indicated by a dashed line in the drawing. The liquid crystal molecules 32 are dispersed in the gaps between the polymers 31 and are aligned such that major axes thereof extend in the first direction X. The polymers 31 and the liquid crystal molecules 32 have optical anisotropy or refractive anisotropy. The liquid crystal molecules 32 may be positive liquid crystal molecules having positive dielectric anisotropy or may be negative liquid crystal molecules having negative dielectric anisotropy. The polymers 31 and the liquid crystal molecules 32 differ from each other in responsivity to an electric field. The responsivity of the polymers 31 to an electric field is lower than the responsivity of the liquid crystal molecules 32 to an electric field. As will be described later, the first display panel PNL1 has a transparent state in which the first display panel PNL1 transmits the light emitted from the light source unit LU in the first liquid crystal layer 30 and a scattering state in which the first display panel PNL1 scatters the light emitted from the light source unit LU in the first liquid crystal layer 30. For example, the transparent state is formed in a state where voltage is not applied to the first liquid crystal layer 30, and the scattering state is formed in a state where voltage is applied to the first liquid crystal layer 30.

The second display panel PNL2 emits display light regardless of whether light is emitted from the light source unit LU or not. For example, the second display panel PNL2 may be a liquid crystal display panel which selectively reflects or selectively transmits illumination light from an illumination device or may be a self-luminous display panel which comprises an organic electroluminescent (EL) element, etc.

The polarizer PL has a transmission axis TA for transmitting linearly polarized light. In the example illustrated, the transmission axis TA is parallel to the second direction Y. That is, the display light from the second display panel PNL2 is the transmitted light of the polarizer PL and linearly polarized light having a vibration direction parallel to the second direction Y. Here, an incidence plane IP in which the display light enters the first display panel PNL1 is shown by a dashed line in the drawing. The incidence plane IP is assumed to be parallel to an X-Z plane defined by the first direction X and the third direction Z. In this case, linearly polarized light which is the transmitted light of the polarizer PL is called s-polarized light which is perpendicular to the incidence plane IP. The linearly polarized light parallel to the incidence plane IP is called p-polarized light. The transmitted light of the polarizer PL hardly includes p-polarized light. The extension direction ED is orthogonal to the transmission axis TA. The extension direction ED is not necessarily parallel to the first direction X and only needs to be parallel to the incidence plane IP or the X-Z plane containing the normal to the first display panel PNL1.

The controller CNT controls the first display panel PNL1, the second display panel PNL2 and the light source unit LU.

Figure 2:
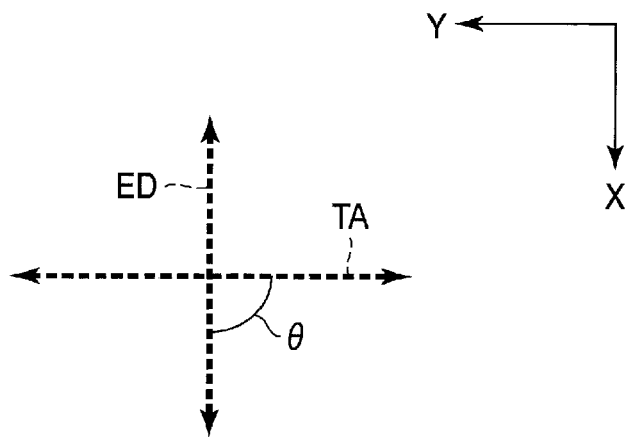
FIG. 2 is a diagram showing the relationship between an extension direction ED of a polymer 31 and a transmission axis TA of a polarizer PL in an X-Y plane parallel to a first main surface M1.

FIG. 2 is a diagram showing the relationship between the extension direction ED of the polymers 31 and the transmission axis TA of the polarizer PL in the X-Y plane parallel to the first main surface M1. As described above, the extension direction ED is parallel to the first direction X, the transmission axis TA is parallel to the second direction Y, and the extension direction ED and the transmission axis TA are orthogonal to each other. An angle θ formed by the extension direction ED and the transmission axis TA is not limited to 90° and is acceptable as long as the angle θ is in the range of 90°±10°.

Figure 3:
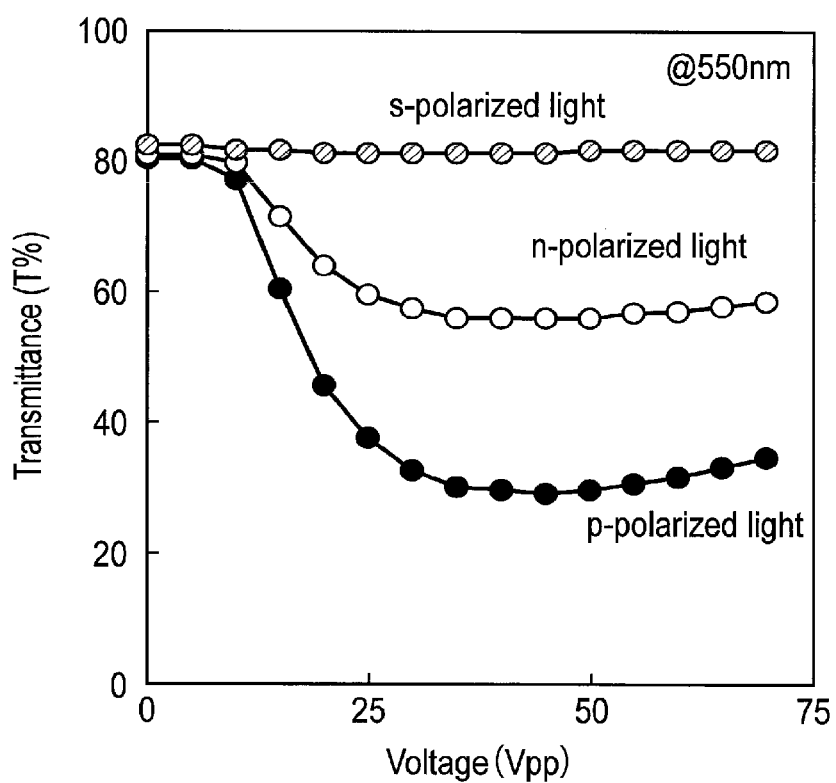
FIG. 3 is a diagram showing the relationship between applied voltage and transmittance in a first display panel PNL1.

FIG. 3 is a diagram showing the relationship between applied voltage and transmittance in the first display panel PNL1. The horizontal axis in the drawing indicates applied voltage (V) which is applied to the first liquid crystal layer 30 and the vertical axis in the drawing indicates transmittance (%). The transmittance corresponds to the ratio of the light transmitted from the second main surface M2 to the light entering from the first main surface M1 regarding the light of a wavelength of 550 nm which travels along the normal to the first display panel PNL1 shown in FIG. 1 (in the third direction Z).

The transmittance of s-polarized light is substantially constant regardless of the magnitude of the applied voltage. On the other hand, the transmittance of p-polarized light decreases as the applied voltage increases, and becomes less than or equal to half the transmittance of s-polarized light. The transmittance of n-polarized light in the drawing corresponds to the average of the transmittance of s-polarized light and the transmittance of p-polarized light.

Figure 4:
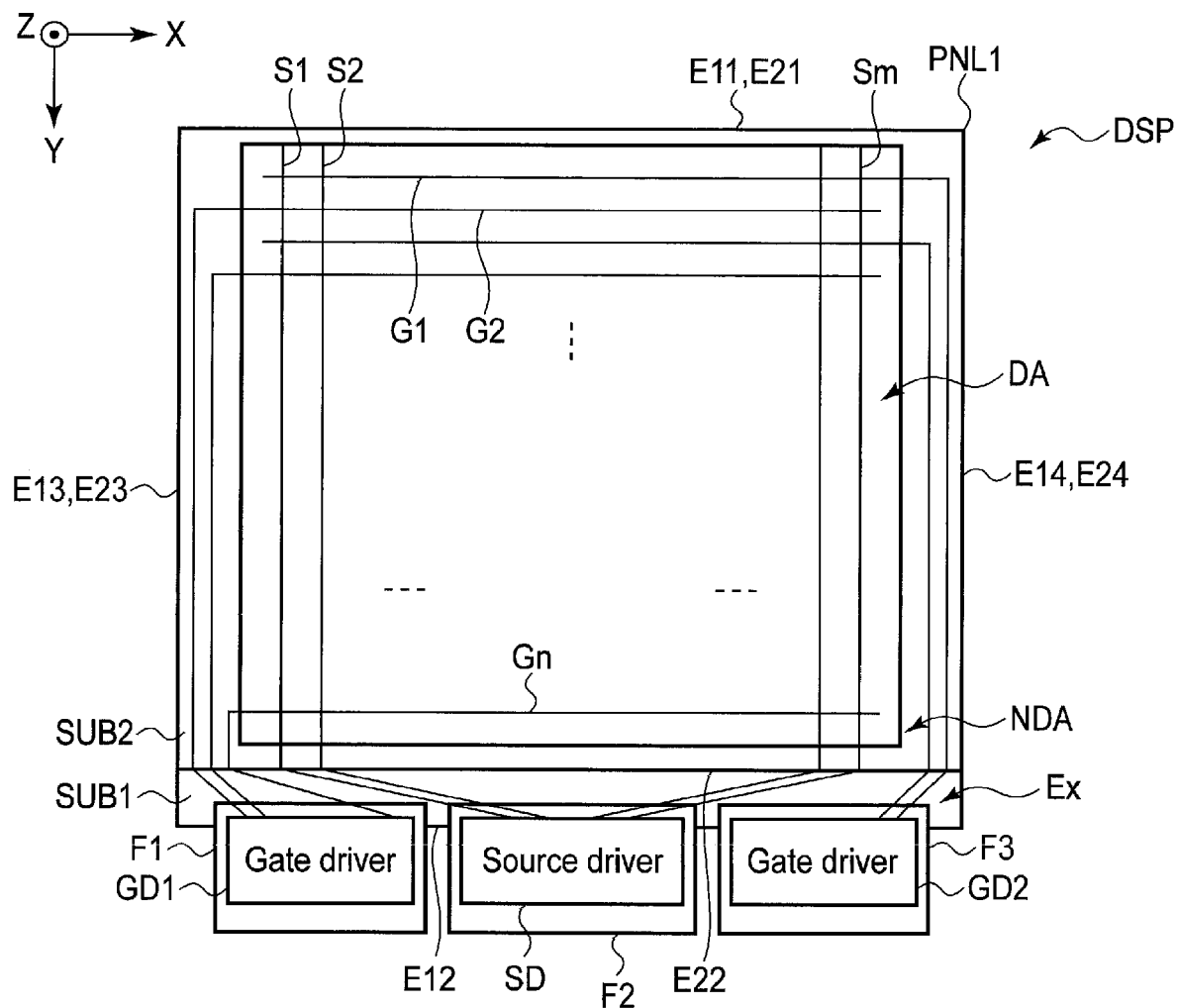
FIG. 4 is a plan view showing a configuration example of the first display panel PNL1 shown in FIG. 1.

FIG. 4 is a plan view showing a configuration example of the first display panel PNL1 shown in FIG. 1. The first display panel PNL1 comprises a first substrate SUB1 and a second substrate SUB2. The first substrate SUB1 and the second substrate SUB2 overlap each other in planar view. The first display panel PNL1 comprises a display area DA on which an image is displayed and a frame-like non-display area NDA which surrounds the display area DA. The display area DA is located in an area in which the first substrate SUB1 and the second substrate SUB2 overlap each other. The first display panel PNL1 comprises n scanning lines G (G1 to Gn) and m signal lines S (S1 to Sm) in the display area DA. Each of n and m is a positive integer, and n may be equal to or different from m. The scanning lines G extend in the first direction X and are spaced apart and arranged in the second direction Y. The signal lines S extend in the second direction Y and are spaced apart and arranged in the first direction X.

The first substrate SUB1 has end portions E11 and E12 extending in the first direction X and end portions E13 and E14 extending in the second direction Y. The second substrate SUB2 has end portions E21 and E22 extending in the first direction X and end portions E23 and E24 extending in the second direction Y. In the example illustrated, the end portion E11 and the end portion E21, the end portion E13 and the end portion E23, and the end portion E14 and the end portion E24 overlap, respectively, in planar view. However, these end portions do not necessarily overlap. The end portion E22 is located between the end portion E12 and the display area DA in planar view. The first substrate SUB1 has an extension portion Ex between the end portion E12 and the end portion E22.

Wiring substrates F1 to F3 are each connected to the extension portion Ex and are arranged in this order in the first direction X. The wiring substrate F1 is provided with a gate driver GD1. The wiring substrate F2 is provided with a source driver SD. The wiring substrate F3 is provided with a gate driver GD2. The wiring substrates F1 to F3 may be replaced with a single wiring substrate.

The signal lines S are drawn to the non-display area NDA and are connected to the source driver SD. The scanning lines G are drawn to the non-display area NDA and are connected to the gate drivers GD1 and GD2. In the example illustrated, odd-numbered scanning lines G are drawn between the end portion El4 and the display area DA and are connected to the gate driver GD2. In addition, even-numbered scanning lines G are drawn between the end portion El3 and the display area DA and are connected to the gate driver GD1. The relationship in connection between the gate drivers GD1 and GD2 and the scanning lines G is not limited to the example illustrated.

Figure 5:
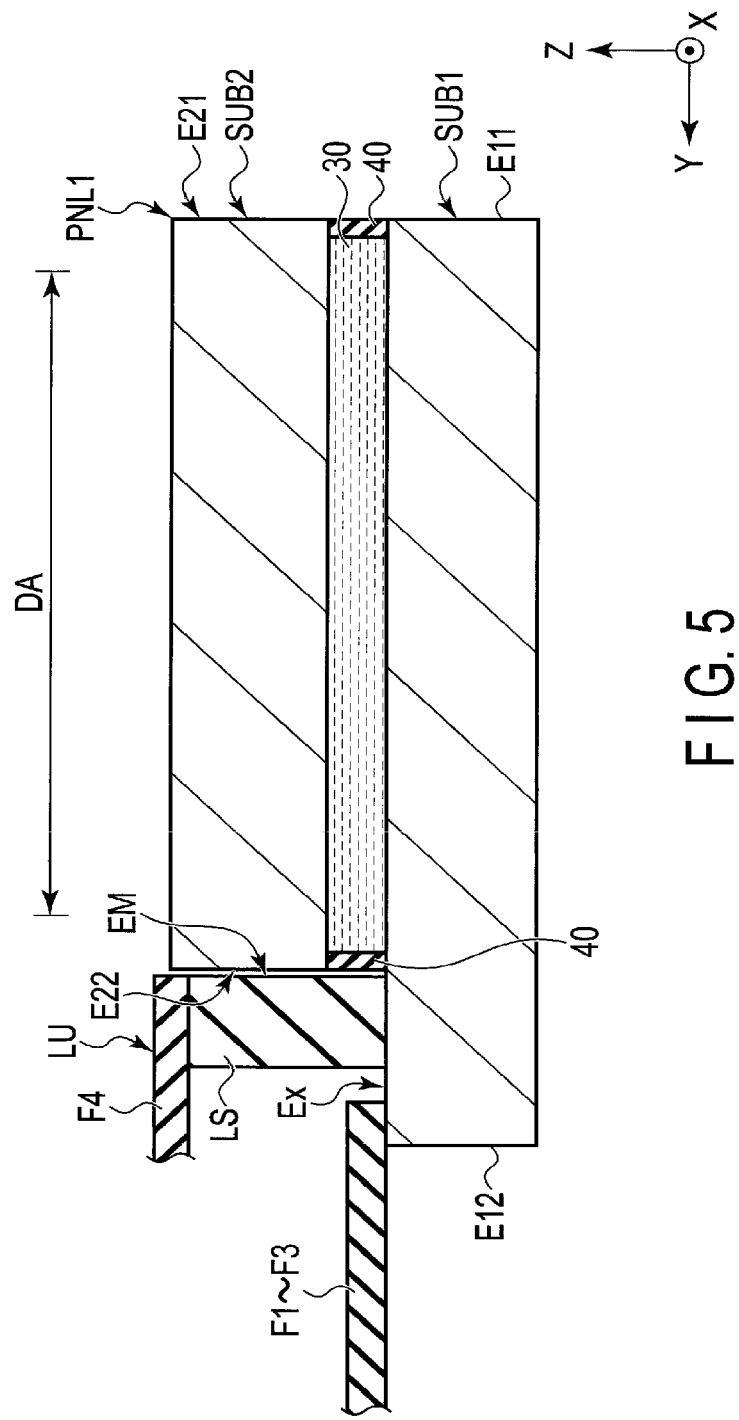
FIG. 5 is a cross-sectional view of the first display panel PNL1 shown in FIG. 4.

FIG. 5 is a cross-sectional view of the first display panel PNL1 shown in FIG. 4. Only main portions in the cross-section of the first display device panel PNL1 in a Y-Z plane defined by the second direction Y and the third direction Z will be described here. The first display panel PNL1 comprises the first liquid crystal layer 30 held between the first substrate SUB1 and the second substrate SUB2. The first substrate SUB1 and the second substrate SUB2 are bonded together by a sealant 40.

The light-emitting element LS in the light source unit LU is connected to the wiring substrate F4. In the example illustrated, the light-emitting element LS is located between the extension portion Ex and the wiring substrate F4 in the third direction Z. In addition, the light-emitting element LS is located between the wiring substrates F1 to F3 and the second substrate SUB2 in the second direction Y. The light-emitting element LS has an emission portion EM opposed to the end portion E22. The light-emitting element LS emits light from the emission portion EM to the end portion E22. The emission portion EM may be in contact with the end portion E22. In addition, an air layer, an optical element or the like may be interposed between the emission portion EM and the end portion E22. The end portion E22 corresponds to an entrance portion which the light emitted from the emission portion EM enters. That is, the end portion E22 corresponds to the end portion PNLE of the first display panel PNL1 shown in FIG. 1. The light which has entered from the end portion E22 propagates through the first display panel PNL1 in the direction opposite to the arrow indicating the second direction Y as will be described later. The light-emitting element LS may be opposed to the end portions of both the first substrate SUB1 and the second substrate SUB2 and may be opposed to, for example, the end portions E11 and E21.

FIG. 6 is an enlarged cross-sectional view of the first display panel PNL1 shown in FIG. 4. The first substrate SUB1 comprises a transparent substrate 10, wiring lines 11, an insulating layer 12, pixel electrodes 13 and an alignment film 14. The second substrate SUB2 comprises a transparent substrate 20, a common electrode 21 and an alignment film 22. The second substrate SUB2 does not comprise a light-shielding layer which overlaps the wiring lines 11. The transparent substrates 10 and 20 are insulating substrates such as glass substrates or plastic substrates. The wiring lines 11 are formed of a nontransparent metal material such as molybdenum, tungsten, aluminum, titanium or silver. The illustrated wiring lines 11 extend in the first direction X but may extend in the second direction Y. The insulating layer 12 is formed of a transparent insulating material. The pixel electrodes 13 and the common electrode 21 are formed of a transparent conductive material such as indium tin oxide (ITO) or indium zinc oxide (IZO). The pixel electrodes 13 are disposed in pixels PX, respectively. The common electrode 21 is disposed across the pixels PX. The alignment films 14 and 22 may be horizontal alignment films having an alignment restriction force substantially parallel to the X-Y plane or may be vertical alignment films having an alignment restriction force substantially parallel to the third direction Z.

The first liquid crystal layer 30 is located between the alignment film 14 and the alignment film 22. In one example, the alignment treatment direction of the alignment films 14 and 22 is parallel to the first direction X, and the alignment films 14 and 22 have an alignment restriction force in the first direction X. The polymers 31 shown in FIG. 1 are obtained in the form of streaks extending in the first direction X, for example, by the polymerization of liquid crystal monomers in a state of being aligned in the first direction X by the alignment restriction force of the alignment films 14 and 22. The first liquid crystal layer 30 is located between the pixel electrodes 13 and the common electrode 21. The applied voltage shown in FIG. 3 corresponds to the potential difference between the pixel electrode 13 and the common electrode 21.

FIG. 7 is a diagram schematically showing the first liquid crystal layer 30 in an off state. The drawing shows a cross-section of the first liquid crystal layer 30 in the X-Z plane intersecting the second direction Y which is the traveling direction of the light from the liquid source unit LU. The off state corresponds to a state in which voltage is not applied to the first liquid crystal layer 30 (for example, a state in which the potential difference between the pixel electrode 13 and the common electrode 21 is approximately zero). An optical axis Ax1 of the polymer 31 and an optical axis Ax2 of the liquid crystal molecule 32 are parallel to each other. In the example illustrated, the optical axis Ax1 and the optical axis Ax2 are parallel to the first direction X. The polymer 31 and the liquid crystal molecule 32 have substantially equal refractive anisotropy. That is, the ordinary refractive index of the polymer 31 and the ordinary refractive index of the liquid crystal molecule 32 are substantially equal to each other, and the extraordinary refractive index of the polymer 31 and the extraordinary refractive index of the liquid crystal molecule 32 are substantially equal to each other. For this reason, there is hardly any refractive index difference between the polymer 31 and the liquid crystal molecule 32 in all directions including the first direction X, the second direction Y and the third direction Z.

FIG. 8 is a diagram schematically showing the first liquid crystal layer 30 in an on state. The on state corresponds to a state in which voltage is applied to the first liquid crystal layer 30 (for example, a state in which the potential difference between the pixel electrode 13 and the common electrode 21 is greater than or equal to a threshold value). As described above, the responsivity of the polymer 31 to an electric field is lower than the responsivity of the liquid crystal molecule 32 to an electric field. In one example, the alignment direction of the polymer 31 (the extension direction ED shown in FIG. 1) hardly changes regardless of the presence of an electric field. On the other hand, the alignment direction of the liquid crystal molecule 32 changes in accordance with an electric field when high voltage which is greater than or equal to the threshold value is applied to the first liquid crystal layer 30. That is, as illustrated in the drawing, the optical axis Ax1 is substantially parallel to the first direction X, whereas the optical axis Ax2 is inclined with respect to the first direction X. If the liquid crystal molecule 32 is a positive liquid crystal molecule, the liquid crystal molecule 32 is aligned such that a major axis thereof extends along an electric field. The electric field between the pixel electrode 13 and the common electrode 21 is formed in the third direction Z. Therefore, the liquid crystal molecule 32 is aligned such that the major axis thereof or the optical axis Ax2 extends in the third direction Z. That is, the optical axis Ax1 and the optical axis Ax2 intersect each other. Therefore, there is a large refractive index difference between the polymer 31 and the liquid crystal molecule 32 in all directions including the first direction X, the second direction Y and the third direction Z.

FIG. 9 is a cross-sectional view showing the first display panel PNL1 in a case where the first liquid crystal layer 30 is in the off state. A light beam L11 emitted from the light-emitting element LS enters the first display panel PNL1 from the end portion E22 and propagates through the transparent substrate 20, the first liquid crystal layer 30, the transparent substrate 10 and the like. If the first liquid crystal layer 30 is in the off state, the light beam L11 is transmitted and hardly scattered in the first liquid crystal layer 30. The light beam L11 propagates through the first display panel PNL1 and hardly leaks from the first main surface M1 which is the lower surface of the transparent substrate 10 and the second main surface M2 which is the upper surface of the transparent substrate 20. That is, the first liquid crystal layer 30 is in a transparent state.

FIG. 10 is a cross-sectional view showing the first display panel PNL1 in a case where the first display panel PNL1 includes an area in which the first liquid crystal layer 30 is in the on state. A light beam L21 emitted from the light-emitting element LS enters the first display panel PNL1 from the end portion E22 and propagates through the transparent substrate 20, the first liquid crystal layer 30, the transparent substrate 10 and the like. In the example illustrated, the first liquid crystal layer 30 overlapping a pixel electrode 13A is in the off state, and the first liquid crystal layer 30 overlapping a pixel electrode 13B is in the on state. For this reason, the light beam L21 is transmitted and hardly scattered in an area of the first liquid crystal layer 30 which overlaps the pixel electrode 13A, while the light beam L21 is scattered in an area of the first liquid crystal layer 30 which overlaps the pixel electrode 13B. Of the light beam L21, some scattered light beams L211 are transmitted through the first main surface M1, some scattered light beams L212 are transmitted through the second main surface M2, and the other scattered light beams propagate through the first display panel PNL1. These scattered light beams L211 and L212 correspond to the display light from the first display panel PNL1 and form the display image of the first display panel PNL1.

Figure 11:
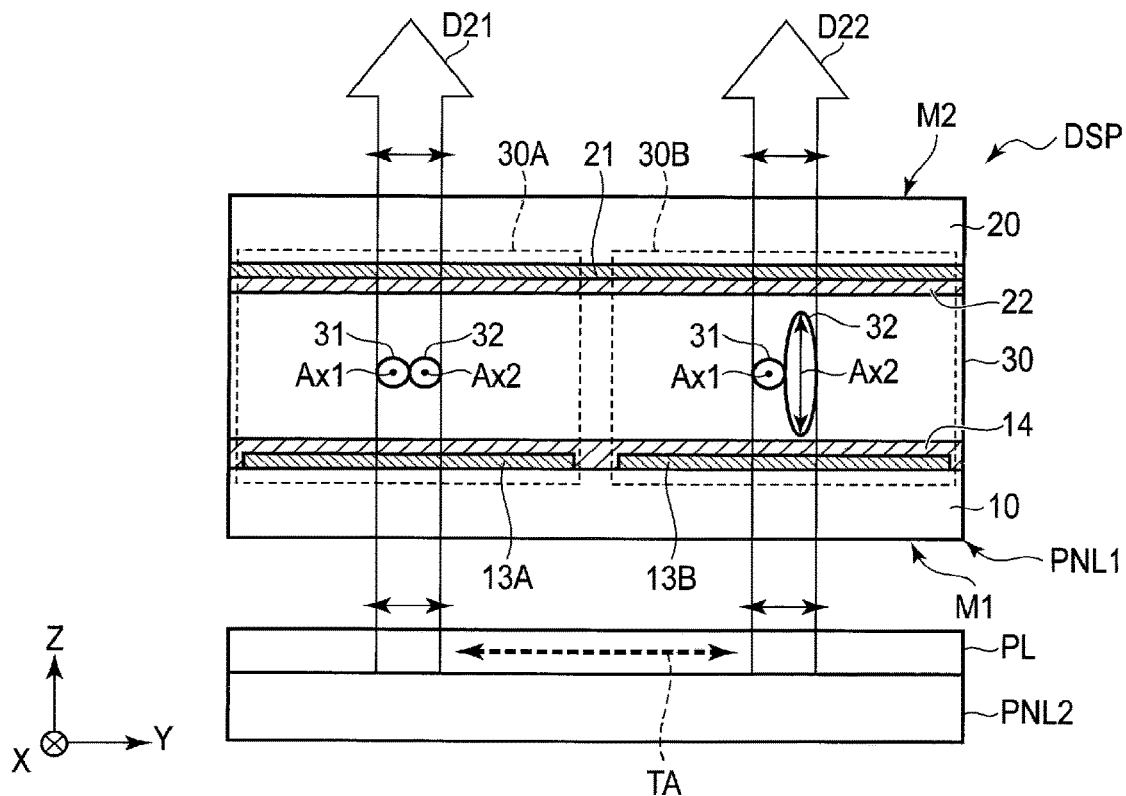
FIG. 11 is a diagram schematically showing the way the display light from a second display panel PNL2 is transmitted through the first display panel PNL1.

FIG. 11 is a diagram schematically showing the way the display light from the second display panel PNL2 is transmitted through the first display panel PNL1. The drawing shows a cross-section of the first display panel PNL1 in the Y-Z plane containing the third direction Z, which is the traveling direction of display light beams D21 and D22 from the second display panel PNL2, and the transmission axis TA of the polarizer PL. The display light beams D21 and D22 transmitted through the polarizer PL are s-polarized light as described above and are linearly polarized light having a vibration direction parallel to the second direction Y.

The first liquid crystal layer 30 has an off area (first area) 30A in the off state which is indicated by a dashed line on the left side of the drawing and an on area (second area) 30B in the on state which is indicated by a dashed line on the right side of the drawing. In the off area 30A, the optical axis Ax1 of the polymer 31 and the optical axis Ax2 of the liquid crystal molecule 32 are parallel to the first direction X as described above. In other words, the polymer 31 and the liquid crystal molecule 32 have an extraordinary refractive index in the first direction X. In the on area 30B, the optical axis Ax1 of the polymer 31 is parallel to the first direction X and the optical axis Ax2 of the liquid crystal molecule 32 is parallel to the third direction Z as described above. In other words, the polymer 31 has an extraordinary refractive index in the first direction X and the liquid crystal molecule 32 has an extraordinary refractive index in the third direction Z.

The display light beam D21 is transmitted through the off area 30A and the display light beam D22 is transmitted through the on area 30B in the first display panel PNL1. Since the display light beams D21 and D22 are s-polarized light, the display light beams D21 and D22 is transmitted through the second main surface M2 while polarization states thereof are being maintained and are hardly influenced by the extraordinary refractive indexes of the polymer 31 and the liquid crystal molecule 32 in the first display panel PNL1. That is, as described with reference to FIG. 3, the transmittance of s-polarized light is constant regardless of the magnitude of the applied voltage of the first liquid crystal layer 30. In other words, the display light beams D21 and D22 (s-polarized light) which enter the first display panel PNL1 from the second display panel PNL2 are transmitted through the first display panel PNL1 while the polarization state of s-polarized light is being maintained and are hardly scattered in the first display panel PNL1. The display light beams D21 and D22 form the display image of the second display panel PNL2.

Next, a more specific configuration example will be described.

Figure 12:
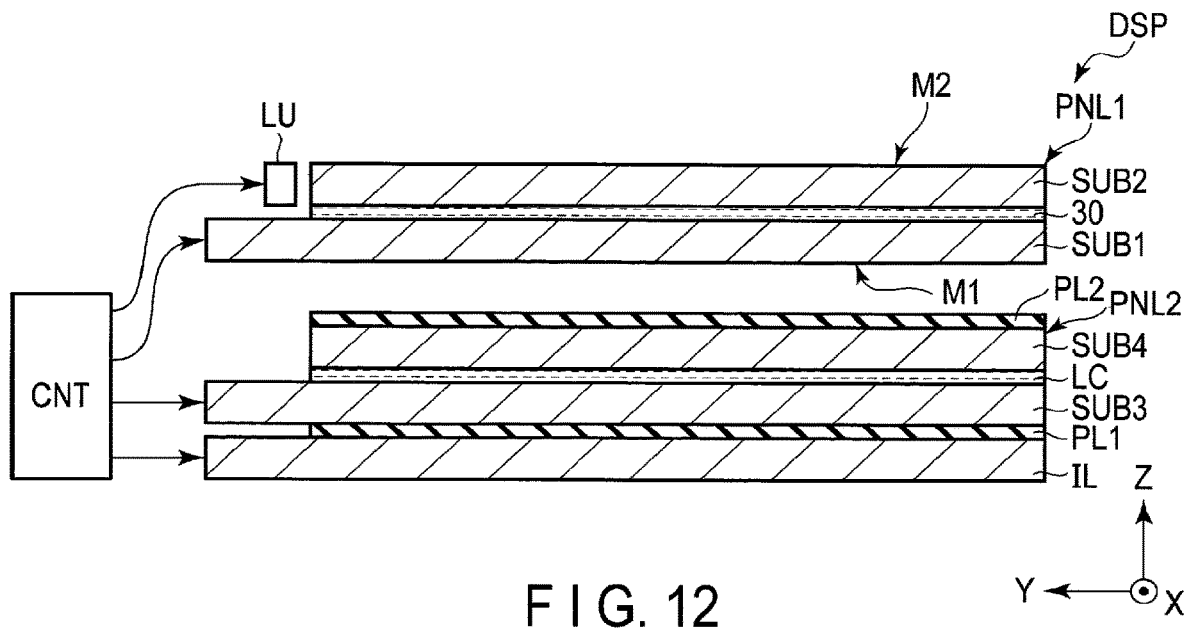
FIG. 12 is a cross-sectional view showing a configuration example of the display device DSP of the present embodiment.

FIG. 12 is a cross-sectional view showing a configuration example of the display device DSP of the present embodiment. The display device DSP comprises the first display panel PNL1, the light source unit LU, the second display panel PNL2, an illumination device IL, polarizers PL1 and PL2 and the controller CNT. The polarizer PL1 is located between the illumination device IL and the second display panel PNL2. The polarizer PL2 is located between the first display panel PNL1 and the second display panel PNL2. The second display panel PNL2 is located between the polarizer PL2 and the illumination device IL.

The second display panel PNL2 comprises a third substrate SUB3, a fourth substrate SUB4 and a second liquid crystal layer LC. The fourth substrate SUB4 is opposed to the third substrate SUB3. The second liquid crystal layer LC is held between the third substrate SUB3 and the fourth substrate SUB4. The polarizer PL1 is bonded to the third substrate SUB3. The polarizer PL2 is bonded to the fourth substrate SUB4 in one example but may be bonded to the first main surface M1 of the first substrate SUB1. The transmission axis of the polarizer PL2 is, for example, orthogonal to the transmission axis of the polarizer PL1 in the X-Y plane. The polarizer PL2 corresponds to the polarizer PL shown in FIG. 1, etc.

Regarding the configuration of the second display panel PNL2, detailed description thereof will be omitted here, but the second display panel PNL2 may be configured in conformity with a display mode using a lateral electric field along a substrate main surface, a display mode using a longitudinal electric field along the normal to a substrate main surface, a display mode using an inclined electric field which is inclined with respect to a substrate main surface, or a display mode using an appropriate combination of the lateral electric field, the longitudinal electric field and the inclined electric field. The substrate main surface here is a surface parallel to the X-Y plane.

The controller CNT controls the first display panel PNL1, the light source unit LU, the second display panel PNL2 and the illumination device IL. For example, the controller CNT supplies a first control signal including a first video signal to the first display panel PNL1. In addition, the controller CNT supplies a light source control signal to the light source unit LU in synchronization with the supply of the first control signal to the first display panel PNL1. On the other hand, the controller CNT supplies a second control signal including a second video signal to the second display panel PNL2. In addition, the controller CNT supplies an illumination control signal to the illumination device IL. The second video signal is, for example, a signal different from the first video signal. As a result, a display image based on the first video signal is displayed on the first display panel PNL1 and a display image based on the second video signal is displayed on the second display panel PNL2.

An air layer or a transparent member having a refractive index similar to that of the first substrate SUB1, etc., may be interposed between the first display panel PNL1 and the second display panel PNL2, between the polarizer PL2 and the first display panel PNL1 or between the polarizer PL2 and the second display panel PNL2. In addition, the first display panel PNL1 may be turned upside down, that is, the second substrate SUB2 may be located between the first substrate SUB1 and the polarizer PL2. In addition, a light guide which propagates the light emitted from the light source unit LU in the X-Y plane may be disposed between the first display panel PNL1 and the second display panel PNL2.

If the display device DSP is required to give a three-dimensional appearance (or an appearance of depth) by the display image of the first display panel PNL1 and the display image of the second display panel PNL2, the first display panel PNL1 and the second display panel PNL2 should preferably be located at a predetermined distance from each other in the third direction Z. If the display device DSP is required to give an appearance of depth particularly, the edge of the display image of the first display panel PNL1 and the edge of the display image of the second display panel PNL2 should preferably be shifted from each other.

Figure 13C:
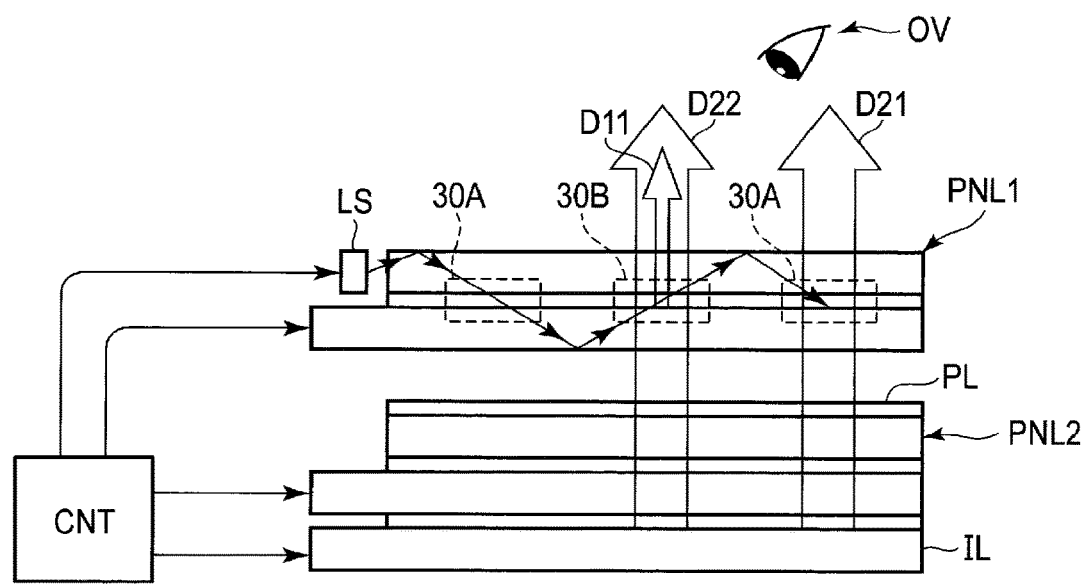
FIG. 13C is an explanatory diagram showing a display mode of the display device DSP shown in FIG. 12.

FIGS. 13A to 13C are explanatory diagrams showing the display modes of the display device DSP shown in FIG. 12.

FIG. 13A shows the first mode in which only the second display panel PNL2 emits the display light beam D21. The light source unit LU is in a non-lighting state in which the light source unit LU does not emit light. The video signal is not supplied from the controller CNT to the first display panel PNL1, and the entire area of the first liquid crystal layer 30 is the off area 30A. The illumination device IL and the second display panel PNL2 are controlled by the controller CNT. The illumination device IL is in a lighting state in which the illumination device IL emits illumination light. The second display panel PNL2 is controlled based on the video signal from the controller CNT, selectively transmits the illumination light from the illumination device IL, and thereby emits the display light beam D21 which is s-polarized light.

In the first mode, the display light beam D21 is transmitted through the first display panel PNL1 while the polarization state is being maintained. Therefore, if the user observes the display device DSP from the observation position OV, the user can observe the display image displayed on the second display panel PNL2 via the first display panel PNL1.

FIG. 13B shows the second mode in which only the first display panel PNL1 emits a display light beam D11. The illumination device IL is in a non-lighting state in which the illumination device IL does not emit illumination light. The video signal is not supplied from the controller CNT to the second display panel PNL2. The light source unit LU and the first display panel PNL1 are controlled by the controller CNT. The first display panel PNL1 is controlled based on the video signal from the controller CNT, transmits the light from the light source unit LU in the off area 30A and scatters the light from the light source unit LU in the on area 30B, and thereby emits the display light beam D11.

In the second mode, if the user observes the display device DSP from the observation position OV, the user can observe the display image displayed on the first display panel PNL1.

FIG. 13C shows the third mode in which the first display panel PNL1 emits the display light beam D11 and the second display panel PNL2 emits the display light beam D21 and the display light D22. The light source unit LU and the first display panel PNL1 are controlled by the controller CNT. In addition, the illumination device IL and the second display panel PNL2 are controlled by the controller CNT. The first display panel PNL1 transmits the light from the light source unit LU in the off area 30A and scatters the light from the light source unit LU in the on area 30B, and thereby emits the display light beam D11, as in the case with the second mode. The second display panel PNL2 selectively transmits the illumination light from the illumination devise IL, and thereby emits the display light beams D21 and D22 which are s-polarized light, as in the case with the first mode.

The display light beam D21 is not scattered but is transmitted through the off area 30A of the first display panel PNL1 while the polarization state is being maintained. The display light beam D22 is not scattered but is transmitted through the on area 30B of the first display panel PNL1 while the polarization state is being maintained. That is, the first display panel PNL1 emits both the display light beam D11 and the display light D22 in the on area 30B.

In the third mode, if the user observes the display device DSP from the observation position OV, the user can observe the display image displayed on the first display panel PNL1, and the user can also observe the display image displayed on the second display panel PNL2 via the first display panel PNL1.

According to the present embodiment described above, the extension direction ED of the streak-like polymers 31 contained in the first display panel PNL1 is orthogonal to the vibration direction of the linearly polarized light which enters from the first main surface M1 of the first display panel PNL1. This linearly polarized light is transmitted through the second main surface M2 of the first display panel PNL1 while the polarization state is being maintained and is hardly scattered in the first liquid crystal layer 30 regardless of the magnitude of the applied voltage of the first liquid crystal layer 30 in the first display panel PNL1. That is, undesirable scattering of the display light from the second display panel PNL2 located on the back side of the first display panel PNL1 can be suppressed. As a result, degradation of the display quality can be suppressed. When the second display panel PNL2 is observed via the first display panel PNL1 in this display device DSP, the display image of the second display panel PNL2 can be clearly viewed.

Next, another configuration example will be described.

Figure 14:
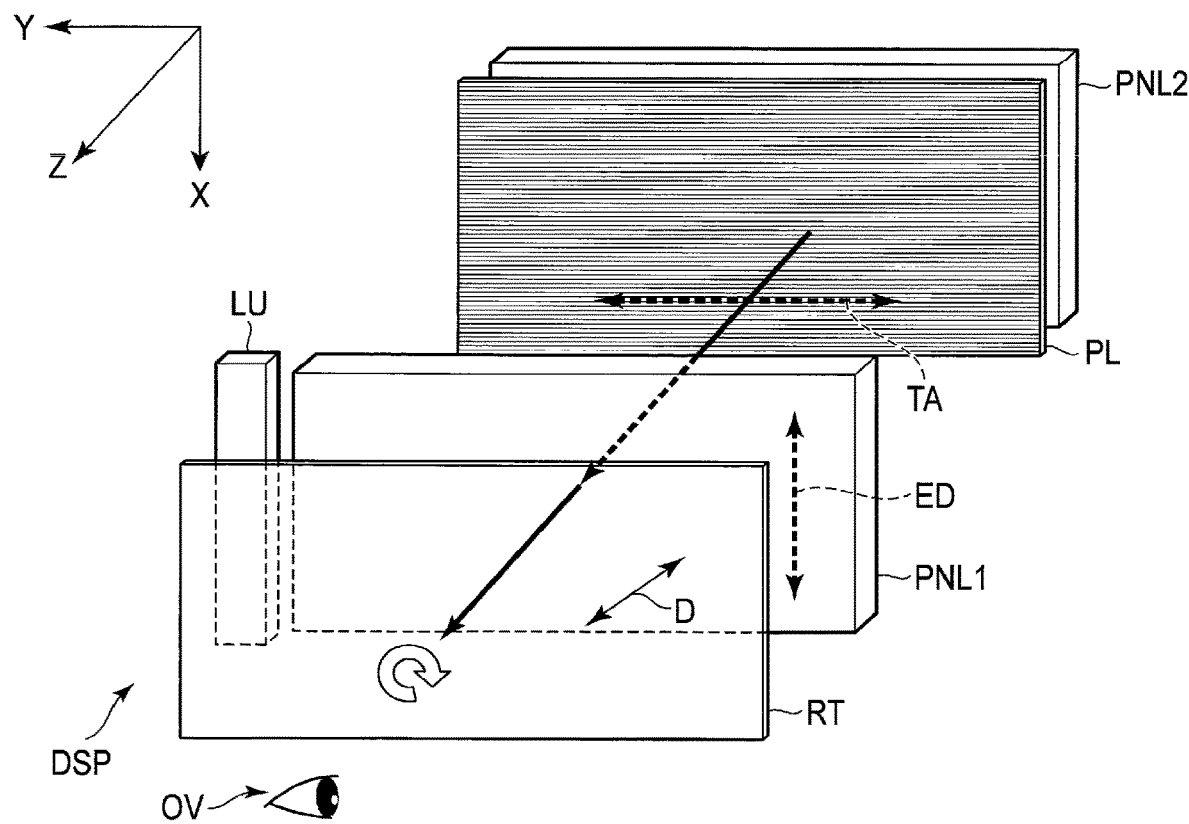
FIG. 14 is a perspective view showing another configuration example of the display device DSP of the present embodiment.

FIG. 14 is a perspective view showing another configuration example of the display device DSP of the present embodiment. The configuration example shown in FIG. 14 differs from the configuration example shown in FIG. 1 in that a retarder RT is disposed on the observation position OV side of the first display panel PNL1. The first display panel PNL1 is located between the polarizer PL and the retarder RT. With respect to the transmitted light of a predetermined wavelength ($\lambda$=550 nm), the retarder RT gives a retardation of $\lambda/4$. The angle formed by a slow axis D of the retarder RT and the transmission axis TA of the polarizer PL is 45° in the X-Y plane. Therefore, the linearly polarized light (s-polarized light) transmitted through the first display panel PNL1 is transmitted through the retarder RT and converted into circularly polarized light.

In this configuration example also, advantages similar to those of the above-described configuration example can be achieved. In addition, when the user observes the display device DSP while wearing polarized sunglasses from the observation position OV, the user can view both the display image of the first display panel PNL1 and the display image of the second display panel PNL2.

In addition, if a viewing angle compensation film is provided in addition to the retarder, the image quality can be improved against the light which enters the first display panel PNL1 obliquely. This viewing angle compensation film may be used alone without the retarder.

FIG. 15 is a perspective view showing another configuration example of the display device DSP of the present embodiment. The configuration example shown in FIG. 15 differs from the configuration example shown in FIG. 1 in that the first display panel PNL1 is a liquid crystal display panel using vertical alignment type PDLC.

The first display panel PNL1 has a cross-section structure similar to the cross-section structure described with reference to FIG. 6. However, the alignment films 14 and 22 are vertical alignment films. In the first display panel PNL1, the polymer 31 and the liquid crystal molecule 32 are aligned in the third direction Z in the off area 30A, and the optical axis Ax1 and the optical axis Ax2 are parallel to the third direction Z. In the on area 30B, only the alignment direction of the liquid crystal molecule 32 changes and the optical axis Ax2 is parallel to the first direction X. The alignment direction of the liquid crystal molecule 32 in the on area 30B can be controlled, for example, by the following methods.

In one example, an electric field formed between the pixel electrode 13 and the common electrode 21 includes an inclined electric field which is inclined with respect to the third direction Z. Such an inclined electric field can be formed, for example, by providing a projection or providing a slit in the pixel electrode 13 and the common electrode 21. The liquid crystal molecule 32 is aligned in the first direction X in the X-Y plane by the inclined electric field.

In another example, if rubbing treatment or the like is applied to the alignment films 14 and 22 which are vertical alignment films beforehand, the liquid crystal molecules 32 located near the alignment films 14 and 22 are aligned in a pretilted manner. The liquid crystal molecules 32 are aligned in the first direction X by the interaction between the pretilt of the liquid crystal molecules 32 and the electric field formed between the pixel electrode 13 and the common electrode 21.

The light which has reached the off area 30A from the light-emitting element LS is not scattered but propagates through the first display panel PNL1 in the second direction Y. In addition, the display light beam (s-polarized light) D21 from the second display panel PNL2 is not influenced by the extraordinary refractive indexes of the polymer 31 and the liquid crystal molecule 32, and is not scattered but is transmitted through the first display panel PNL1 while the polarization state is being maintained in the off area 30A.

The light which has reached the on area 30B from the light-emitting element LS is scattered and emitted from the first display panel PNL1. In addition, the display light beam (s-polarized light) D22 from the second display panel PNL2 is not scattered but is transmitted through the first display panel PNL1 while the polarization state is being maintained in the on area 30B as is the case with the off area 30A.

In this configuration example also, advantages similar to those of the above-described configuration example can be achieved.

As described above, a display device which can suppress degradation of display quality can be provided by the present embodiment.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
   a first display panel;
   a polarizer opposed to the first display panel and including
      a transmission axis for transmitting linearly polarized light; and
   a second display panel, wherein
   the first display panel comprises:
      a first substrate;
      a second substrate opposed to the first substrate; and
      a first liquid crystal layer held between the first substrate and the second substrate and including streak-like polymers and liquid crystal molecules, an extension direction of the polymers is substantially orthogonal to the transmission axis, and the polarizer is located between the first display panel and the second display panel.

2. The display device of claim 1, wherein an angle formed by the extension direction and the transmission axis is in a range of 90°±10°.

3. The display device of claim 1, further comprising a light source unit opposed to an end portion of the first display panel, wherein the end portion extends in the extension direction.

4. The display device of claim 3, wherein the light source unit comprises a light-emitting element disposed on an extension portion of the first substrate and a wiring substrate connected to the light-emitting element, and the light-emitting element includes an emission portion opposed to an end portion of the second substrate.

5. The display device of claim 4, wherein the first substrate comprises a pixel electrode disposed in each pixel, and the second substrate comprises a common electrode disposed across the pixels.

6. The display device of claim 3, further comprising a controller, wherein the controller supplies a first video signal to the first display panel, supplies a light source control signal to the light source unit and supplies a second video signal to the second display panel.

7. The display device of claim 1, further comprising a retarder, wherein the first display panel is located between the polarizer and the retarder.

8. A display device comprising:

a first display panel;

a polarizer opposed to the first display panel and including a transmission axis for transmitting linearly polarized light;

a second display panel; and an illumination device, wherein the first display panel comprises:
 a first substrate;
 a second substrate opposed to the first substrate; and
 a first liquid crystal layer held between the first substrate and the second substrate and including streak-like polymers and liquid crystal molecules, and an extension direction of the polymers is substantially orthogonal to the transmission axis, the polarizer is located between the first display panel and the second display panel, the second display panel is located between the polarizer and the illumination device, and the second display panel comprises a third substrate, a fourth substrate and a second liquid crystal layer held between the third substrate and the fourth substrate.

9. The display device of claim 8, wherein an angle formed by the extension direction and the transmission axis is in a range of 90°±10°.

10. The display device of claim 8, further comprising a light source unit opposed to an end portion of the first display panel, wherein the end portion extends in the extension direction.

11. The display device of claim 10, wherein the light source unit comprises a light-emitting element disposed on an extension portion of the first substrate and a wiring substrate connected to the light-emitting element, and the light-emitting element includes an emission portion opposed to an end portion of the second substrate.

12. The display device of claim 11, wherein the first substrate comprises a pixel electrode disposed in each pixel, and the second substrate comprises a common electrode disposed across the pixels.

13. The display device of claim 11, further comprising a controller, wherein the controller supplies a first video signal to the first display panel, supplies a light source control signal to the light source unit, supplies a second video signal to the second display panel and supplies an illumination control signal to the illumination device.

14. The display device of claim 8, further comprising a retarder, wherein the first display panel is located between the polarizer and the retarder.

* * * * *